United States Patent [19]

Freimanis et al.

[11] 4,056,691
[45] Nov. 1, 1977

[54] TELEPHONE SUBSCRIBER LINE CIRCUIT

[75] Inventors: Laimons Freimanis, Chicago; Harry Edward Mussman, Glen Ellyn; DeWitt Paul Smith, Naperville, all of Ill.

[73] Assignee: Bell Telephone Laboratories, Incorporated, Murray Hill, N.J.

[21] Appl. No.: 757,006

[22] Filed: Jan. 5, 1977

[51] Int. Cl.² ............................................. H04Q 1/28
[52] U.S. Cl. .............................. 179/18 FA; 179/16 F
[58] Field of Search ................... 179/16 F, 77, 18 F, 179/18 FA, 18 HB, 18 H, 81 R, 84 R, 84 A; 323/22 T

[56] References Cited

U.S. PATENT DOCUMENTS

| | | | |
|---|---|---|---|
| 3,522,384 | 7/1970 | Rickett et al. | 179/16 F |
| 3,546,564 | 12/1970 | Denny | 323/22 T |
| 3,914,556 | 10/1975 | Frazee | 179/18 F |
| 3,955,052 | 5/1976 | Orbach | 179/18 FA |
| 4,027,235 | 5/1977 | Macrander et al. | 179/18 FA |

*Primary Examiner*—Thomas A. Robinson
*Attorney, Agent, or Firm*—Peter Visserman

[57] ABSTRACT

A communication line interface circuit including a floating current source supplying a constant current substantially independent of loop length is disclosed. The line interface circuit is provided with circuitry for line supervision and the detection of dial pulse signaling.

12 Claims, 5 Drawing Figures

TELEPHONE SUBSCRIBER LINE CIRCUIT

CROSS-REFERENCE TO RELATED APPLICATION

This application is related to the application of L. Freimanis entitled "Telephone Subscriber Line Circuit" Ser. No. 757,005 filed concurrently herewith and assigned to the assignee of the present application.

BACKGROUND OF THE INVENTION

The invention relates to a communication line interface circuit for use in a switching office and more particularly relates to a telephone line interface circuit adapted to detect open and closed circuit conditions of the line.

In telephone systems, line circuits serve as an interface between communication lines connected to subscriber sets and the telephone switching network. Traditionally, the line circuit has been used to provide battery to the line causing current flow when the subscriber set is in the off-hook condition, which current flow may result in the operation of a relay or activation of a sensing device at the switching office. After an on-hook to off-hook transition has been detected at the switching office, power required for signaling and talking over the subscriber line and further supervision of the subscriber line is customarily transferred to other circuits in the switching office. Since, in many instances, telephone lines are physically located in the vicinity of electrical power lines, so-called longitudinal currents are frequently induced in a subscriber line and detection circuits connected to subscriber lines must be carefully balanced and adjusted to avoid the induced currents. It has been recognized that the effect of the longitudinal currents may be minimized by isolating the subscriber line from ground. In that case, a transformer-coupled power supply may be used. Even with a floating circuit, a ferrod sensor or the like commonly used in the current art, for example, in the No. 1 ESS Telephone Switching System manufactured by Western Electric Company, or even a relay could be used. However, such devices are costly.

SUMMARY OF THE INVENTION

It is an object of this invention to provide a means for detecting loop openings and closures at the line interface circuit.

It is a further object of this invention to provide inexpensive circuitry for detection of the off-hook state of a subscriber set while minimizing power consumption and to detect dial pulse signaling originating from a rotary dial or the like which presents signaling in the form of open and closed circuits.

It is a further object of this invention to provide a means for preventing the application of excessive voltages to a high-impedance line which is driven by a transformer-coupled constant current source.

In accordance with this invention, a sense winding is provided which is magnetically coupled to the secondary coil of the output transformer of a power supply which provides a constant current and is transformer-coupled to the subscriber line. A voltage will be induced in the sense winding which corresponds to the voltage developed across the secondary of the transformer. The voltage developed by the constant current sources across the secondary is directly dependent upon the impedance of the subscriber line. Customarily, a telephone subscriber set connected to the subscriber line will present an open circuit to the line when the set is in the on-hook state and will present a closed circuit to the line when the set is in the off-hook state. A line interface circuit in accordance with this invention will include a flip-flop which will be referred to as the SCAN flip-flop, and which may be set by means of the telephone switching system's central controller when originating scanning of the line is to be performed. When the SCAN flip-flop is in the set state, a series of clock pulses generated elsewhere in the system is applied to the power supply to activate the power supply periodically and only for the period of time that each clock pulse is applied. The output voltage generated by the periodic activation will be reflected in the sense winding and will be applied to one terminal of a comparator circuit. The other terminal of the comparator may be connected to a reference voltage. It will be apparent that the reference voltage and the values of the circuit components may be readily adjusted to cause the comparator to generate an output signal when the output voltage exceeds a specified minimum level. Since the output voltage will reflect the relative value of line impedance, the comparator output signal may be used as an indication of the on-hook and off-hook state of the line.

After an origination has taken place, the SCAN flip-flop will be reset and another flip-flop referred to as the TALK flip-flop may be set. When this flip-flop is in the set state, the power supply circuit is continuously activated, independent of the clock pulses, supplying talking current to the subscriber set. If the connected subscriber set has a rotary dial and dial pulses are being transmitted from the subscriber set, the line impedance will reflect the on-hook and off-hook states in alternating sequence. In the off-hook state, the output voltage will be relatively low. However, in the on-hook state, the line impedance approaches infinity and since the current supply attempts to deliver a constant current independent of load, the output voltage will tend to rise to excessively high values. In accordance with this invention, the aforementioned sense winding, which is connected to a comparator, is clamped to a supply voltage through a light emitting diode. As the output voltage rises, the voltage induced in the sense winding will rise to a corresponding value. The clamping diode, however, will prevent the sense winding voltage from exceeding the supply voltage. When current flows in the light emitting diode, an optically-coupled transistor is activated, generating an output signal. The switching system's central controller, by periodically interrogating the output terminal of the transistor, will be able to distinguish the dial pulses received on the subscriber line. Advantageously, the diode clamp of the sense winding to the supply voltage as described above will prevent excessive voltages from being applied across the line since the low impedance above a certain threshold voltage, as seen by the sense winding, will be reflected in the transformer secondary. By proper selection of the turns ratio of the sense winding to transformer secondary and the value of the supply voltage to which the sense winding is clamped, the maximum allowable voltage may be controlled.

It is a feature of this invention that a relatively inexpensive detection circuit may be incorporated in a power supply circuit having an output transformer.

It is a further feature of this invention that the detection circuit may be used for line origination and for the receipt of dial pulse signaling information.

It is yet another feature of the invention that the maximum output voltage of a constant current source having an output transformer may be maintained below a specified level.

BRIEF DESCRIPTION OF THE DRAWING

The above and other objects and features of this invention are illustrated in the following description in which reference is made to the accompanying drawing, in which.

DETAILED DESCRIPTION

Figure 1:
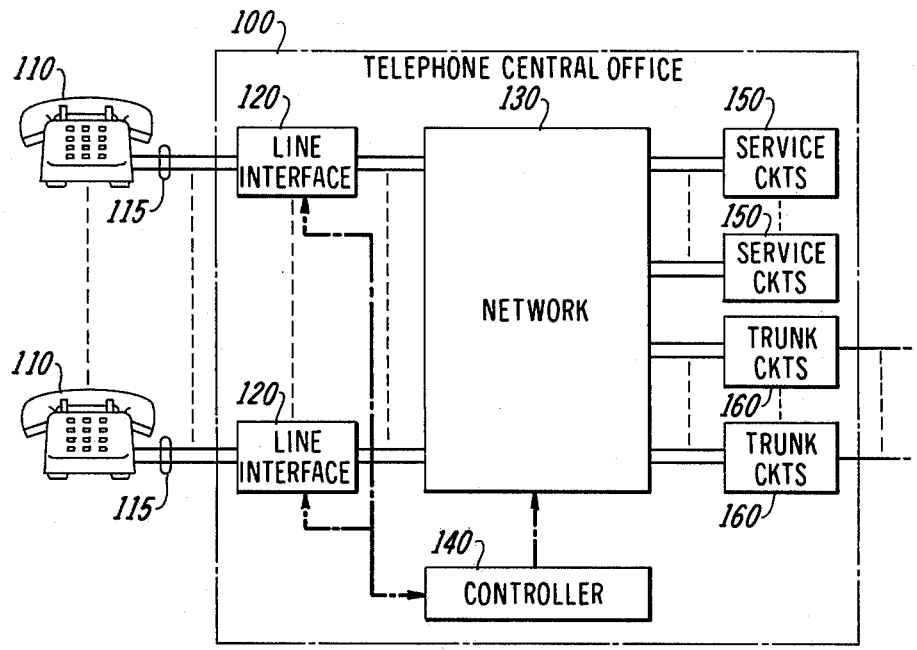
FIG. 1 is a representation of a telephone communication system in general block diagram form.

In an illustrative embodiment of this invention as depicted in the drawing and described herein, a plurality of telephone subscriber sets 110 are connected to a telephone central office 100 by means of communication lines 115 and line interface circuits 120. By way of illustration, a central office may comprise a switching network 130, a plurality of line interface circuits 120, as well as a controller 140, service circuits 150, and trunk circuits 160. As is customary, the line circuits provide an interface between the communication lines 115 and the switching network 130. The service circuits 150 generally include such circuits as signal pulse receivers, tone circuits, etc. The trunk circuits provide an interface with the transmission lines connected to a distant central office. The controller 140 will sense the operational state and activities of the lines and trunk circuits to detect certain signaling information and will control the network to establish connections between the various circuits and control the state of the circuits as required.

Figure 2:
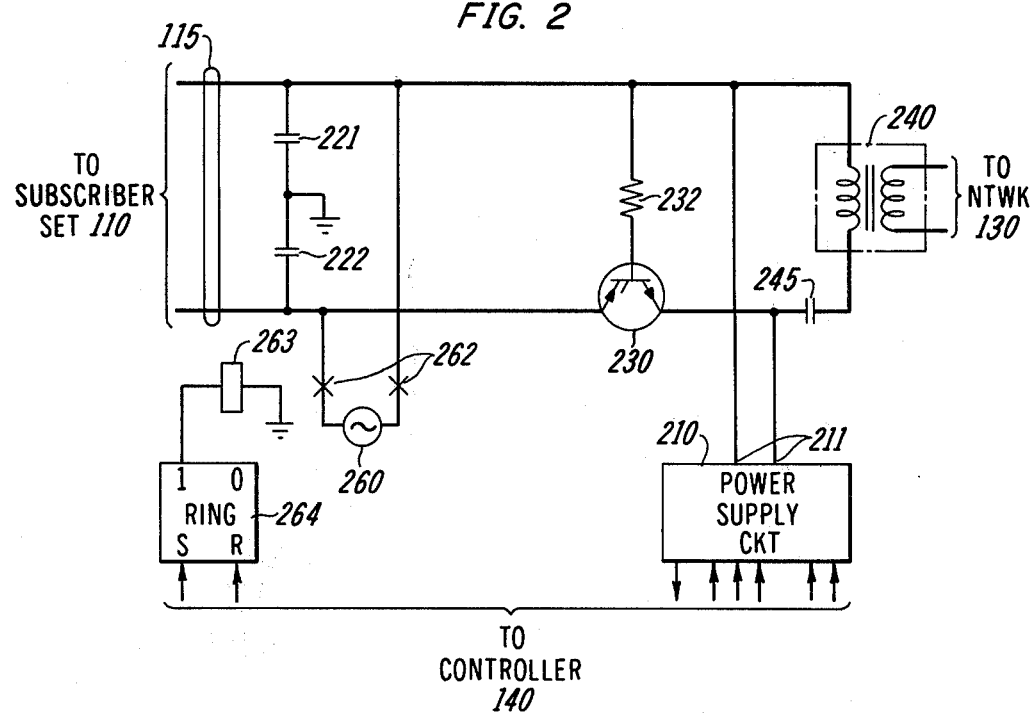
FIG. 2 shows a communication line interface circuit for use in a telephone communication system in accordance with the invention.

The details of the line interface circuit arrangement 120 are discussed with reference to FIG. 2. One end of the line circuit is connected to a subscriber set by means of communication lines 115. Direct current will be supplied to the line and to the subscriber set from the power supply circuit 210 which is connected to the line interface circuit by conductors 211. When the subscriber set is in the on-hook state, the set presents an open circuit and no current will flow in the loop. When the subscriber set goes off-hook, a switch in the set is closed and current supplied by the interface circuit will begin to flow in the loop. The flow of current is sensed by the controller 140 by periodically scanning the line in the central office. After detection of the off-hook condition, the controller 140 will initiate further actions for completion of the call. In the case of an originating call from a subscriber, dial tone will be supplied and dial signaling information must be received; and in case of a call to a station, ringing current must be supplied to the line. Since the network 130 may comprise solid-state crosspoints, which are not designed to withstand voltages of a magnitude customarily generated by available ringing tone generators, ringing current is applied to the line 115 without passing through the network 130 or the interface circuit in this illustrative embodiment. The line 115 is connected directly to a ringing current generator 260 by means of relay contacts 262. The relay 263 which operates the contacts 262 is controlled by the RING flip-flop 264 which, in turn, is set and reset from the controller 140. To isolate the line 115 from the network 130 during ringing, a solid-state device commonly known as a thyristor is provided. For the purpose of isolation, a solid-state device such as a thyristor is preferred over metallic relay contacts or the like, since relays are bulkier and generally more costly than solid-state devices. In the normal operative state of the circuit, the thyristor 230 will be in saturation due to base current supplied by the resistor 232. During the ringing period the power supply circuit will be deactivated by the controller 140, as described further below, and no current will be supplied to the thyristor which will act as an isolator in the off state. The line interface circuit is coupled to the network 130 by means of transformer 240. The capacitor 245 is provided to block the flow of direct current to the transformer 240.

Advantageously, the line interface output circuit will not be referenced to earth ground and will be considered to be a floating circuit. Consequently, so-called longitudinal currents induced in communication lines from adjacent electrical power lines, primarily 60-hertz alternating currents, will not find a path to ground through the circuit and, hence, will not interfere with the operation of the circuit. To reduce RF interference, a pair of balancing capacitors 221 and 222 are connected between the line conductors and earth ground. However, these may be small capacitors, for example, on the order of 100 picofarads, which will not conduct any significant amount of the 60-hertz alternating currents.

Figure 3:
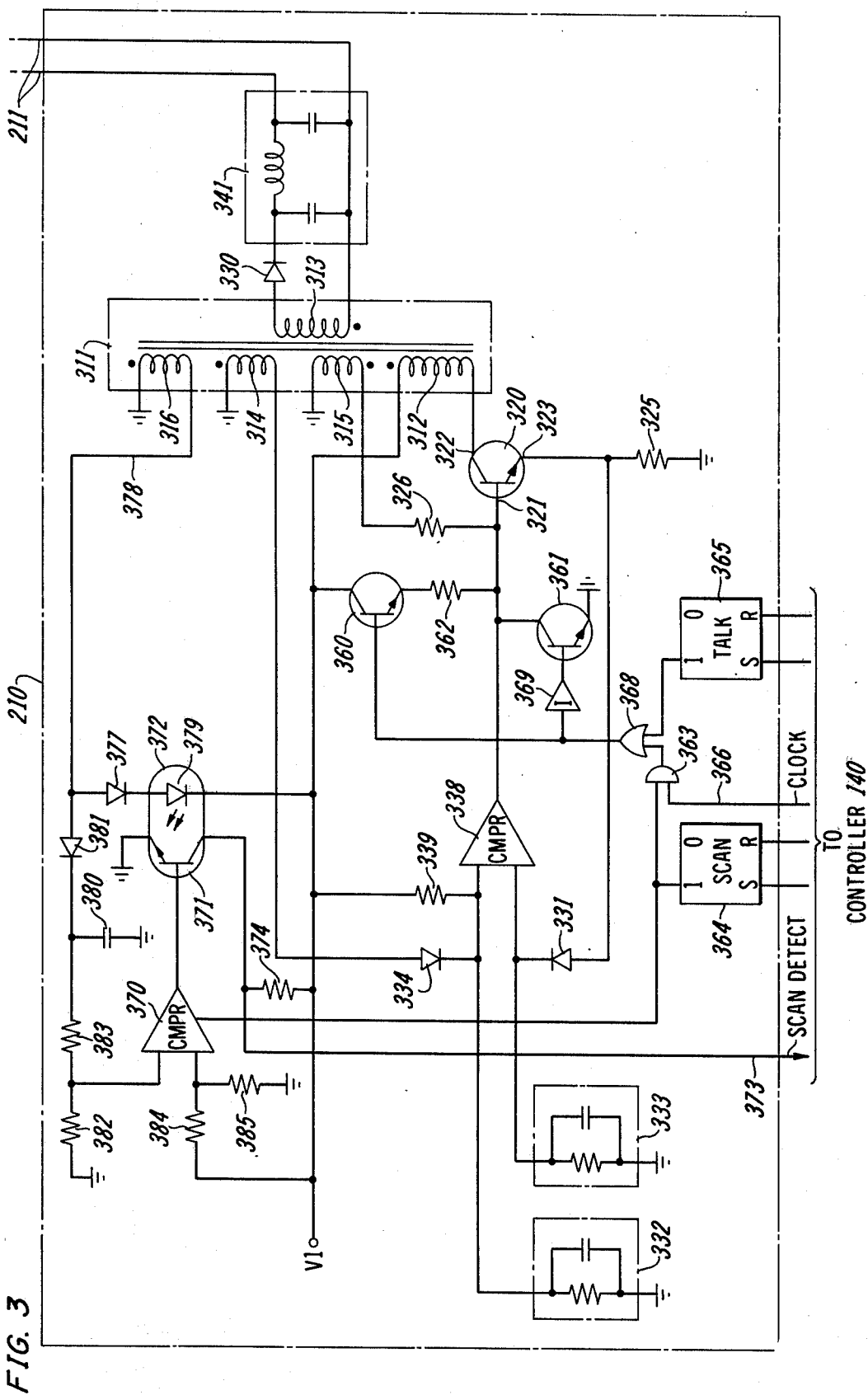
FIG. 3 shows in greater detail the power supply circuit for use with a communication line interface circuit in accordance with one specific embodiment of the invention.

The further details of one specific illustrative embodiment of a power supply circuit 210 are shown in FIG. 3. The power supply circuit comprises a transformer circuit 311 having a primary coil 312, a secondary coil 313, and sense windings 314, 315, and 316. The secondary coil 313 is connected to the output conductors 211 via diode 330 and an LC filter circuit 341. Current flow in the primary coil 312 is controlled by means of the transistor 320. Base current for the transistor 320 may be supplied to the conductor 321 from the D.C. power source designated by V1 through transistor 360 and resistor 362 or from the sense winding 315 and resistor 326. The operation of the transistor 320 may be inhibited by clamping the conductor 321 to ground by means of the transistor 361 or comparator circuit 338. To reduce power consumption of the central office, the line interface circuit will be operative to supply power to the line 115 only when the line is in the talking state or when the line is being scanned for an off-hook or on-hook condition. A SCAN flip-flop 364 and a TALK flip-flop 365, which may be set and reset from the controller 140, are employed to control the power supply circuit. When both the SCAN flip-flop 364 and the TALK flip-flop 365 are in the reset state, the transistor 361 will be in the conducting state clamping the conductor 321 to ground and inhibiting operation of the power supply circuit. Base drive to the transistor 361 is cut off by inverter 369 under control of the OR gate 368 when either the SCAN or TALK flip-flop is in the set state.

Scanning for the on-hook/off-hook state of a communication line may advantageously be done at the power supply circuit 210 of the line interface circuit. To determine the state of the line 115, the controller 140 will set the SCAN flip-flop 364 and will interrogate the state of conductor 373. Origination off-hook scanning will be done with a relatively low frequency in order to reduce power consumption when the line is not in use. The circuit will be activated only on a periodic basis by means of a clock signal which is supplied from the controller 140 on conductor 366. When the SCAN flip-flop 364 is in the set state, the clock signal will appear at the output of the AND gate 363 and cause the transistor 360 to be placed in the conducting state and the transistor 361 to be placed in a nonconducting state for the duration of the clock pulse. In this fashion, base drive will be supplied to the transistor 320 and power will be supplied to the line in a manner described hereinafter. Furthermore, when the SCAN flip-flop 364 is in the set state, the comparator circuit 370 will be enabled. An indication of the level of output voltage will be supplied to one input terminal of the comparator 370 from the sense winding 316. When such level exceeds a reference voltage applied to a second input terminal to the comparator 370, base current will be supplied to the transistor 371 which is part of an optical isolator circuit 372 and which will be referred to later herein. The voltage across the sense winding 316 will be directly proportional to the output voltage across the secondary coil 313. This voltage will be comparatively low in the off-hook state when the line impedance is comparatively low and will be substantially higher in the on-hook state when line impedance is high. The output voltage and the voltage across the sense winding 316 will be in pulse form corresponding to the enabling clock pulses supplied on conductor 366. The capacitor 380 and diode 381 serve as a rectifier circuit. The resistors 382, 383, 384, and 385 are provided to adjust the input signals of the comparator 370 to desired levels.

When the transistor 371 is in a nonconducting state, the conductor 373 will have the same positive potential as the power source V1; and when the transistor 371 is in a conducting state, the potential on conductor 373 will be near zero. The state of the conductor 373 will be interrogated by the controller 140 and a determination can be made as to the on-hook or off-hook condition of the line 115 as a function of the output voltage across the line 115 as sensed by the sense winding 316.

Figure 4:
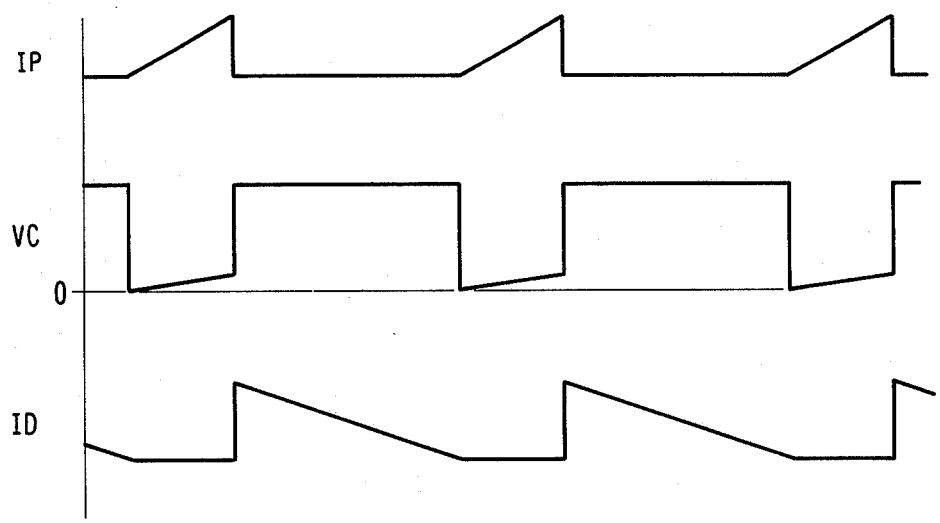
FIG. 4 shows current and voltage waveforms at selected points in the circuit.

The base current supplied by the transistor 360 will preferably be sufficient only to place the transistor 320 in the active state. When transistor 320 is in the active state, current will begin to flow in the primary coil 312. This current will induce a voltage across the feedback sense winding 315 supplying additional current to the base of the transistor 320 through the feedback resistor 326. The amount of current supplied to the base of the transistor 320 must be sufficient to hold the transistor in saturation during the desired period of increasing current flow in the primary coil 312. It will be recognized that the current supplying capacity of the feedback circuit is determined by the turns ratio of the sense winding 315 to the primary coil 312 and the value of the feedback resistor 326. FIG. 4 shows typical waveforms for the primary current IP, the collector voltage VC as seen on conductor 322, and the secondary current ID flowing through diode 330. As may be seen from FIG. 4, the primary current IP, which is initially at zero, will increase substantially as a ramp function. The collector voltage initially drops to a near zero value, and thereafter slowly rises as the voltage across the emitter resistor 325 increases. Eventually, the collector current will increase to such a value that the base current becomes insufficient to keep the transistor 320 in saturation and the transistor will turn off abruptly. The transformer discharge cycle will be initiated at that time and current ID will begin to flow and decrease substantially as a ramp function. During the discharge cycle, a potential is induced across the sense winding 315 which is opposite in polarity to the potential induced in the coil during the transformer charge cycle. The current supplied through the transistor 360 will be relatively small (e.g., on the order of 1 milliampere) and the resistor 326, connected between the base of transistor 320 and the winding 315, may be on the order of 1000 ohms causing a drop across the resistor on the order of 1 volt. The potential developed by the sense winding 315 during the discharge cycle will ordinarily be several volts, causing a negative potential to be applied to the base conductor 321. A potential will also be induced in the sense winding 314 during the discharge cycle, causing the RC circuit 332 to be charged through diode 334. The amount of charge on the RC circuit 332 is a function of the potential induced in winding 314, which is a function of the output voltage produced across the secondary coil 313, which, in turn, depends on the output impedance across the line. In case of a high impedance, the discharge cycle will be relatively short but the output voltage will be large. As the output impedance decreases, the period required for discharge will increase, but output voltage will decrease. The charge across the RC circuit 332, which is connected to one input terminal of the comparator 338, will be increased or decreased accordingly, depending upon the impedance of the load. At the end of the discharge period, the negative polarity voltage induced across the sense winding 315 will disappear and the base current will again flow to the transistor 320 causing the transistor to be turned on. After the transistor has been turned on, the voltage across the emitter resistor 325 will increase, which increase will be sensed at the comparator 338 by means of the connection from the emitter conductor 323 by way of diode 331 to the comparator 338. The emitter resistor may be small. In one experimental circuit arrangement, a 10-ohm resistor was found to be suitable. When the voltage across the resistor reaches a value greater than the charge across the RC circuit 332, the comparator will clamp the base conductor 321 to ground, causing the transistor 320 to be turned off again and the discharge cycle to be initiated once again. The RC circuit 333 is connected to the comparator input terminal which senses the voltage across the resistor 325. The purpose of this RC circuit is to function as a race elimination circuit. Without this circuit, a race condition may occur in which the transistor 320 will be turned off and on in rapid succession.

Figure 5:
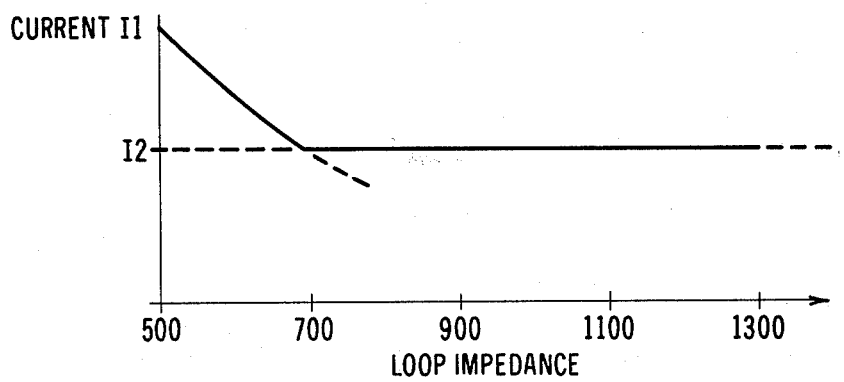
FIG. 5 is a graph of the output current as a function of loop impedance.

As mentioned earlier herein, it may be desirable to generate a high current output for short, low resistance loops where standard telephone sets equipped with current shunted varistors are connected to the line. When a subscriber set is at the end of a long loop, the voltage applied across the subscriber set will be relatively low while in a short loop, the voltage will be high since there is no significant voltage drop in the line. In order to accommodate conventional sets equipped with varistors, the power supply circuit 210 is allowed to produce a high current in low resistance lines. This is accomplished by means of a bias voltage applied to the RC circuit 332 through resistor 339. The bias potential requires the voltage across the resistor 325 to rise to the bias value even when the transformer output as sensed in winding 314 is relatively low. Consequently, the transistor 320 will remain in the conducting state for a longer period of time than would normally occur without the bias and a higher output current is produced. Since the bias is fixed, the effect of the bias will be most pronounced for very low impedance loops. As the impedance of the loop increases, the output voltage of the circuit rises and the voltage across the RC circuit 332 eventually will exceed the bias potential and a constant current will be supplied thereafter. FIG. 5 shows the output current characteristic curve as a function of load resistance where the bias is applied by means of resistor 339. The current I1 indicated on the drawing represents the current in a loop having essentially only the impedance of a standard subscriber set. A typical value for I1 may be 30 milliamperes. Without the use of the comparator circuit 338, the current would continue to decrease as the loop impedance increases. Depending on the selected value of the resistor 339 and the resistance of the RC circuit 332, the effect of the comparator 338 may be inhibited for certain lower values of load impedance, for example, below 700 ohms. For larger values of impedance (e.g., 700 to 3000 ohms) the action of the comparator will take over, producing a substantially constant output current I2 of, for example, 25 milliamperes. It will be understood that actual values of the output current will depend, to a large extent, on the characteristics of a commercially available output transformer.

As described earlier herein, supervision to determine the on-hook and off-hook state of the line may be accomplished in the SCAN state of the circuit. Dial pulse signaling from a rotary dial at the subscriber set may also be detected at the power supply circuit 210 of the line interface circuit by periodic interrogation of the circuit by the controller 140. When a rotary dial of a subscriber set is operated, the line will be successively opened and closed at the subscriber set. Such open circuit and closed circuit conditions may be detected at the line interface circuit while the circuit is in the TALK state. In the TALK state, full power will normally be supplied to the subscriber line, in contrast to the condition in the SCAN state in which power is applied only for a short period of time under control of a clock pulse. When the line circuit is opened while the interface circuit is in the TALK state, a high voltage will tend to develop across the secondary transformer coil 313 which will be reflected in the other coils of the transformer, including the sense winding 316. As a consequence, a high voltage will develop across the serially connected diodes 377 and 379. The latter is a light emitting diode which is clamped to the potential of the power supply V1 and is optically coupled to the transistor 371. When the voltage reflected across the sense winding 316 exceeds the supply voltage by an amount equivalent to the sum of the forward voltage drops of the diodes 377 and 379, current will begin to flow in the diodes and transistor 371 will be placed in the conducting state by means of the optical coupling between the transistor and the light emitting diode 379. When the transistor 371 is placed in the conducting state, the voltage level of the conductor 373 will drop to a near zero level. By periodic interrogation of the conductor 373 by the controller 140, the dial pulse signaling information may be transferred to the controller 140. The conventional diode 377 is not essential in the circuit. It is employed only to provide better isolation than is generally obtained from light emitting diodes.

Clamping of the output of sense winding 316 to the power supply potential V1 also provides protection against excessive voltages which would otherwise tend to develop in the output transformer with an open circuit load and which could damage the circuit. It will be recognized that the maximum attainable output voltage is directly dependent on the value of the power supply potential V1 and the coupling between the sense winding 316 and the secondary coil 313.

It is to be understood that the above-described arrangement is merely an illustrative application of the principles of the invention and that numerous other arrangements may be devised by those skilled in the art without departing from the spirit and scope of the invention.

What is claimed is:

1. A line interface circuit for detecting both off-hook and dial pulse signaling on a line comprising:
   a constant current power supply having an output transformer;
   a sense winding magnetically coupled to said transformer;
   a source of reference potential;
   a comparator circuit having one input connected to said sense winding and another input connected to said source of reference potential;
   circuit means connected between said sense winding and said source of reference potential and responsive to the potential induced in said sense winding; and
   signal generating means alternatively responsive to said comparator circuit and said circuit means to generate an output signal.

2. A line interface circuit in accordance with claim 1 further comprising first means for activating said power supply at periodic intervals to detect off-hook signaling on said line and second means for activating said power supply continuously to detect dial pulse signaling on said line.

3. A line interface circuit in accordance with claim 1 wherein said signal generating means includes a transistor having its base connected to the output of said comparator circuit.

4. A line interface circuit in accordance with claim 3 wherein said transistor is a phototransistor and said circuit means includes a light emitting diode optically coupled to said transistor.

5. A line interface circuit in accordance with claim 1 wherein clock pulse signals are applied to the interface circuit and further comprising a first flip-flop circuit for activating said power supply only in the presence of the clock pulse signals to detect off-hook signaling on said line and a second flip-flop circuit for activating said power supply independent of the clock pulse signals to detect dial pulse signaling on said line.

6. A line interface circuit comprising:
   a transformer;
   a sense winding magnetically coupled to said transformer;
   a source of reference potential;
   circuit means including a diode connected between said sense winding and said source of reference potential; and signaling generating means including a transistor responsive to current flow through said circuit means for generating an output signal, said diode being responsive to a potential at said sense winding exceeding said reference potential source for conducting current, whereby further increase in output voltage from said transformer is prevented.

7. A line interface circuit in accordance with claim 6 wherein said diode comprises a light emitting diode and said transistor comprises an optically activated transistor, optically coupled to said diode.

8. A line interface circuit connectable to a telephone line and adapted to detect both off-hook conditions on the line and dial pulse signaling on the line represented by open and closed circuit conditions comprising:

a constant current power supply having an output transformer including a secondary winding;

means for applying clock pulse signals to the interface circuit;

first and second control flip-flops each having a set and a reset state;

means connected to said first and second control flip-flops for activating said power supply only in the presence of one of said clock pulse signals when said first flip-flop is in said set state and for activating said power supply circuit independent of said clock pulse signals when said second flip-flop is in said set state;

a sense winding magnetically coupled to said transformer secondary winding whereby a potential is induced across said sense winding from said secondary winding;

reference potential source means;

a comparator circuit having one input terminal connected to said sense winding and another input terminal connected to said reference potential source means for generating a comparator output signal when the potential induced in said sense winding exceeds a predetermined potential of said reference potential source means;

circuit means connected between said sense winding and said reference potential source means said responsive to the potential induced in said sense winding exceeding a predetermined potential of said reference potential source means to generate a circuit means signal; and output signal generating means responsive alternatively to said comparator output signal and said circuit means signal for generating output signals representing off-hook conditions and dial pulse signaling on said line.

9. A line interface circuit in accordance with claim 8 wherein said circuit means includes a light emitting diode and wherein said output signal generating means includes a phototransistor optically coupled to said diode.

10. A line interface circuit in accordance with claim 9 wherein said comparator output signal is applied to the base of said phototransistor.

11. A line interface circuit in accordance with claim 8 wherein said means for activating said power supply includes means for preventing activation when both said first and second control flip-flops are in the reset state.

12. A line interface circuit in accordance with claim 11 for interconnecting a telephone line circuit and a telephone switching network and comprising semiconductor switch means to determine the connection from said line to said switching network and means for enabling said semiconductor switch means only when said power supply is activated.

* * * * *

UNITED STATES PATENT AND TRADEMARK OFFICE
CERTIFICATE OF CORRECTION

PATENT NO. : 4,056,691

DATED : November 1, 1977

INVENTOR(S) : Laimons Freimanis, Harry E. Mussman, and DeWitt P. Smith

It is certified that error appears in the above–identified patent and that said Letters Patent are hereby corrected as shown below:

Column 1, line 67, "sources" should read --source--.
Column 10, line 6, "said", second occurrence, should read --and--.

Signed and Sealed this

Twenty-eighth Day of October 1980

[SEAL]

Attest:

SIDNEY A. DIAMOND

Attesting Officer

Commissioner of Patents and Trademarks